(12) United States Patent
Yamashiro

(10) Patent No.: US 11,962,026 B2
(45) Date of Patent: Apr. 16, 2024

(54) POWER SUPPLY DEVICE AND VEHICLE EQUIPPED THEREWITH

(71) Applicant: SANYO Electric Co., Ltd., Osaka (JP)

(72) Inventor: Go Yamashiro, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 485 days.

(21) Appl. No.: 17/263,944

(22) PCT Filed: Jul. 26, 2019

(86) PCT No.: PCT/JP2019/029345
§ 371 (c)(1),
(2) Date: Jan. 28, 2021

(87) PCT Pub. No.: WO2020/031737
PCT Pub. Date: Feb. 13, 2020

(65) Prior Publication Data
US 2021/0320367 A1    Oct. 14, 2021

(30) Foreign Application Priority Data
Aug. 6, 2018   (JP) .................. 2018-147903

(51) Int. Cl.
*H01M 50/242*   (2021.01)
*B60L 50/64*    (2019.01)
(Continued)

(52) U.S. Cl.
CPC ........... *H01M 50/242* (2021.01); *B60L 50/64* (2019.02); *H01M 50/183* (2021.01);
(Continued)

(58) Field of Classification Search
CPC ................... H01M 50/289; H01M 10/0468
See application file for complete search history.

(56) References Cited

FOREIGN PATENT DOCUMENTS

| JP | 2014-010983 | 1/2014 |
|----|------|------|
| JP | 2014010983 A * | 1/2014 |

(Continued)

OTHER PUBLICATIONS

International Search Report of PCT application No. PCT/JP2019/029345 dated Oct. 21, 2019.

*Primary Examiner* — Maria Laios
*Assistant Examiner* — Jordan E Berresford
(74) *Attorney, Agent, or Firm* — WHDA, LLP

(57) ABSTRACT

Power supply device includes: a plurality of secondary battery cells each constituted by closing an open end of quadrangular exterior can opened at one end, with sealing plate; insulating separator interposed between adjacent secondary battery cells; one pair of end plates covering both end faces of battery stack constituted by stacking the plurality of secondary battery cells; and a plurality of fastening members fastening end plates together. Power supply device is configured such that within a region where separator is in contact with secondary battery cell, separator is made less easily deformable in a region on the side of sealing plate than other regions. As a result, a portion of separator in contact with the side of sealing plate is made not to easily deform, and therefore, when secondary battery cell expands, a joint portion between sealing plate and exterior can is protected, and meanwhile, exterior can is allowed to deform at other portions, and thereby, the deformation during expansion can be mitigated.

8 Claims, 17 Drawing Sheets

(51) Int. Cl.
*H01M 50/183* (2021.01)
*H01M 50/209* (2021.01)
*H01M 50/249* (2021.01)
*H01M 50/264* (2021.01)
*H01M 50/289* (2021.01)
*H01M 50/291* (2021.01)

(52) U.S. Cl.
CPC ....... *H01M 50/209* (2021.01); *H01M 50/249* (2021.01); *H01M 50/264* (2021.01); *H01M 50/289* (2021.01); *H01M 50/291* (2021.01)

(56) References Cited

FOREIGN PATENT DOCUMENTS

| | | |
|---|---|---|
| JP | 2016-152203 | 8/2016 |
| JP | 6073583 B | 2/2017 |

* cited by examiner

POWER SUPPLY DEVICE AND VEHICLE EQUIPPED THEREWITH

CROSS-REFERENCE TO RELATED APPLICATIONS

This application is a U.S. national stage application of the PCT International Application No. PCT/JP2019/029345 filed on Jul. 26, 2019, which claims the benefit of foreign priority of Japanese patent application No. 2018-147903 filed on Aug. 6, 2018, the contents all of which are incorporated herein by reference.

TECHNICAL FIELD

The present invention relates to a power supply device and a vehicle equipped therewith.

BACKGROUND ART

The power supply device is used as a power supply device for driving a vehicle, a power supply device for storing power, and the like. As a power supply device of this type, FIG. 16 shows a perspective view of conventional power supply device 900, and FIG. 17 shows an exploded perspective view thereof. As shown in these drawings, a plurality of pieces of secondary battery cells 901 are formed into battery stack 910 by being stack together with separators 940 interposed therebetween. Then, battery stack 910 is fixed by bind bars 930 while being pressed by end plates 920 from both surfaces thereof. As shown in a perspective view of FIG. 18, separator 940 of FIG. 17 is formed in a flat plate shape having a size that covers the entire surface of secondary battery cell 901, and is interposed between adjacent secondary battery cells 901 to insulate the cells.

On the other hand, the secondary battery cell expands and contracts when charging and discharging are repeated. In particular, with the recent demand for higher capacity, the amount of expansion tends to increase as a result of increasing capacity for each piece of secondary battery cell. The power supply device having the above configuration is configured to suppress the expansion of the secondary battery cells constituting the battery stack through end plates 920 and bind bars 930, and a large load is applied to the bind bars and the end plates.

Therefore, in order to reduce the load applied to the bind bars and the end plates, a structure in which the center of separator 940' is recessed as shown in FIG. 19 has been proposed. This separator 940' reduces the load applied to the bind bars and the end plates during expansion by absorbing a bulge occurring during expansion with recess 941 at the center of the separator.

CITATION LIST

Patent Literature

PTL 1: Japanese Patent No. 6073583

SUMMARY OF THE INVENTION

As described above, the configuration of PTL 1 can reduce the load applied to the bind bars and the end plates during expansion, but the effect is limited. Considering the situation in which the amount of expansion has been increasing due to the increase in capacity of the secondary battery cell in recent years, the effect of reducing the load on the bind bars and the end plates during expansion may not be sufficient.

The present invention has been made in view of such a background, and an object of the present invention is to provide a power supply device having a configuration that can further reduce the load applied to the bind bars and the end plates during expansion than the conventional configuration, and a vehicle equipped with the power supply device.

A power supply device according to a certain aspect of the present invention includes: a plurality of secondary battery cells each constituted by closing an open end of a quadrangular exterior can opened at one end, with a sealing plate; an insulating separator interposed between the adjacent secondary battery cells; one pair of end plates covering both end faces of a battery stack constituted by stacking the plurality of secondary battery cells; and a plurality of fastening members fastening the end plates together. In the power supply device, among a region where the separator is in contact with the secondary battery cell, the separator is made less easily deformable in a region on the sealing plate side than other regions.

According to the above configuration, it becomes possible to make a portion of the separator in contact with the sealing plate side of the secondary battery cell difficult to deform, protect a joint portion between the sealing plate and the exterior can during expansion of the secondary battery cell, and allow the deformation of the exterior can at other portions to mitigate the deformation during expansion.

DESCRIPTION OF EMBODIMENTS

Figure 1:
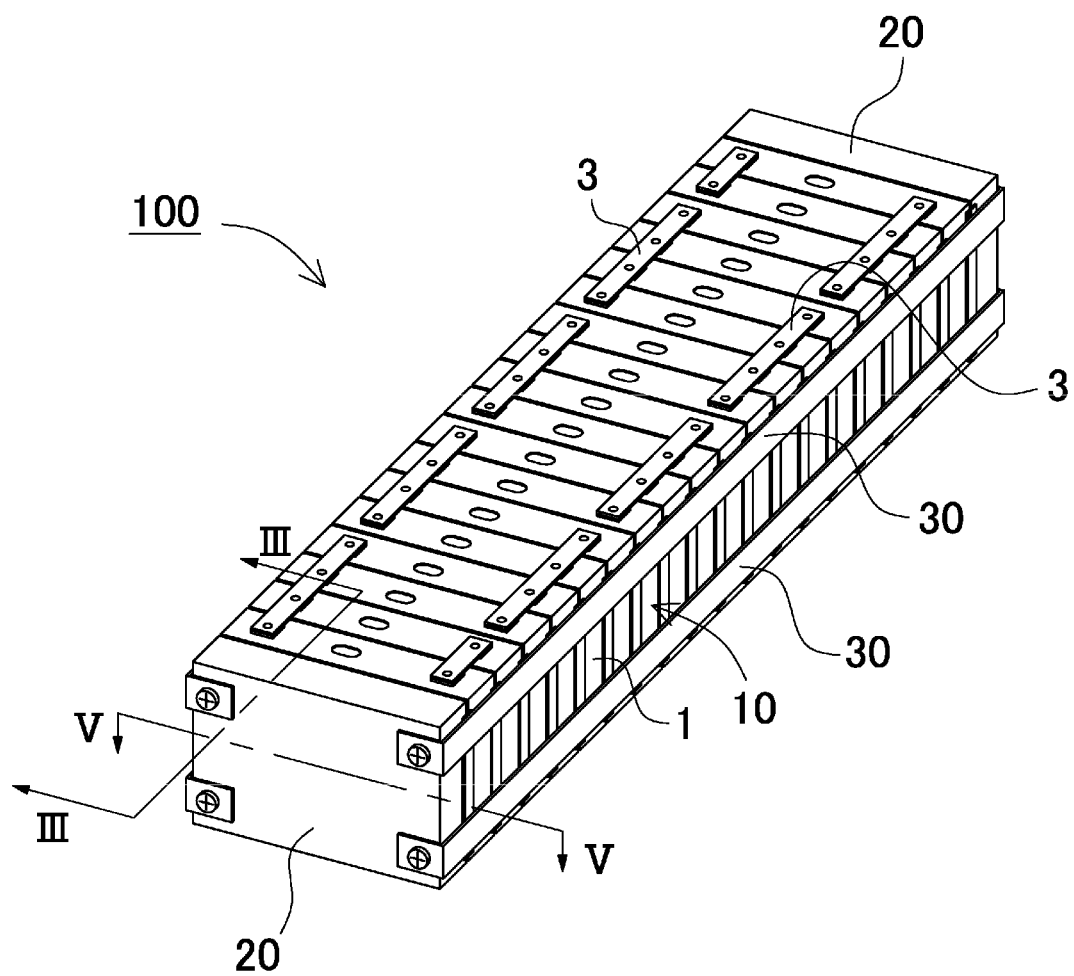
FIG. 1 is a perspective view showing a power supply device according to a first exemplary embodiment.

First, one point of interest of the present invention is described. As described in PTL 1, by allowing the secondary battery cell to expand, the load applied to the bind bars and the end plates during expansion can be reduced. However, in the configuration described in PTL 1, the present inventors have found that the stress may concentrate on the end of the exterior can of the secondary battery cell when the amount of expansion of the secondary battery cell increases. Specifically, when secondary battery cell 901 expands, the end plate bends as shown in the schematic plan view of FIG. 20. The relative displacement of the end plate is regulated through the bind bar, but when the load increases, the end plate cannot maintain its shape. The present inventors have found that, as a result, the load of the secondary battery cells constrained by the end plates and the bind bars is reduced by allowing the expansion of the central portion of the exterior can, but because the expansion at the end of the exterior can located near the bind bar is suppressed, the load is concentrated on the end of the exterior can to possibly cause deformation and breakage. On the other hand, in the process of study, the present inventors have also found that the exterior can may be damaged if the expansion of the secondary battery cell is not sufficiently suppressed. Specifically, the secondary battery cell is constituted by including an exterior can having an opening, and a sealing plate that seals the opening of the exterior can. However, if the exterior can expands too much, the load is applied to a joint portion between the sealing plate and the exterior can to possibly cause breakage. Based on the above findings, the present inventors have found that, in order to prevent a welded portion between the exterior can and the sealing plate from breaking while reducing the load applied to the bind bars and the end plates during expansion, it is important to suppress the expansion of the exterior can at a portion near the sealing plate, and meanwhile, allow the expansion of the battery cell in other portions, and have reached the present invention.

A power supply device according to one exemplary embodiment of the present invention includes: a plurality of secondary battery cells each constituted by closing an open end of a quadrangular exterior can opened at one end, with a sealing plate; an insulating separator interposed between the adjacent secondary battery cells; one pair of end plates covering both end faces of a battery stack constituted by stacking the plurality of secondary battery cells; and a plurality of fastening members fastening the end plates together. In the power supply device, among a region where the separator is in contact with the secondary battery cell, the separator is made less easily deformable in a region on the sealing plate side than other regions.

According to this configuration, the deformation during expansion can be mitigated by protecting the joint portion between the sealing plate and the exterior can during expansion of the secondary battery cell, and meanwhile, allowing the deformation of the exterior can at other portions.

In the power supply device according to the one exemplary embodiment of the present invention, the region of the separator on the sealing plate side of the secondary battery cell is protruded more than the other regions. With the above configuration, the portion among the separator in contact with the sealing plate side of the secondary battery cell is made to protrude to suppress the deformation of the exterior can, and it becomes possible to protect the joint portion between the sealing plate and the exterior can during expansion of the secondary battery cell.

Further, in the power supply device according to another exemplary embodiment of the present invention, among the region of the separator in contact with the secondary battery cell, the region in contact with both side faces of the secondary battery cell is formed lower than the region on the sealing plate side of the secondary battery cell. With the above configuration, the region among the separator in contact with the left and right side faces of the secondary battery cell where the stress tends to concentrate during expansion of the secondary battery cell is made low in height to form a space that allows the deformation, and it becomes possible to mitigate the stress and protect the secondary battery cell.

Further, in the power supply device according to another exemplary embodiment of the present invention, the separator is formed, in the region in contact with the secondary battery cell, in a flat face in the middle in the height direction up to the left and right end edges, and includes, on a part of the separator closer to the sealing plate of the secondary battery cell, a first protruding face protruding more than the flat face and extending along the sealing plate.

According to this configuration, the first protruding face can suppress expansion near the sealing plate, and in the middle in the height direction, a region where expansion is allowed is defined over the left and right end edges of the exterior can. In particular, because the region where expansion is allowed is defined over the left and right end edges of the exterior can, the deformation of the exterior can allows opening deformation centered at the ridgeline of the exterior can, therefore, the concentration of stress is suppressed, and meanwhile, the expansion of the exterior can is allowed. For example, in the conventional configuration exemplified in PTL 1, the expansion of the outer peripheral portion of the wide face of the exterior can is suppressed and the expansion is allowed only in the central portion. However, in this configuration, only extension deformation of the exterior can is allowed, and the stress may concentrate at a boundary between the outer peripheral portion that is pressed and the center part that is allowed to expand. According to the above exemplary embodiment, the opening deformation is expected to be allowed in addition to the extension deformation, and it becomes possible to reduce the stress applied to the exterior can.

The separator may have a second protruding face extending in parallel with the first protruding face formed, on the opposite side to the side having the first protruding face formed, and may have the first protruding face and the second protruding face separately formed.

The first protruding face can also be formed linearly along the sealing plate of the secondary battery cell.

The separator may be formed with the flat face lower than the first protruding face, between the end edge in the extending direction of the first protruding face and the end edge on the side face of the separator.

Further, the separator may be formed with a first step lower than the first protruding face, between a side face of the first protruding face in the longitudinal direction and the end edge of the separator. With the above configuration, it is possible to avoid a situation in which the stress is concentrated near the side face of the exterior can during expansion of the secondary battery cell, and an effect of protecting the exterior can and improving reliability can be obtained.

Furthermore, a vehicle according to another exemplary embodiment of the present invention includes the above power supply device, a running motor to which power is supplied from the power supply device, a vehicle body constituted by having the power supply device and the motor mounted, and wheels that are driven by the motor to make the vehicle body run.

The exemplary embodiments of the present invention are described below with reference to the drawings. However, the exemplary embodiments shown below are examples for embodying the technical idea of the present invention, and the present invention is not specified as the following. Further, the present description does not specify the members shown in the claims as the members of the exemplary embodiments. In particular, the dimensions, materials, shapes, relative arrangements, and the like of the components described in the exemplary embodiments are not intended to limit the scope of the present invention to that alone, and are merely explanatory examples unless otherwise specified. The size and positional relationship of the members shown in each drawing may be exaggerated to clarify the explanation. Further, in the following description, members of the same or the same quality are shown with the same name and reference numeral, and detailed description thereof is omitted as appropriate. Further, respective elements constituting the present invention may be configured such that the plurality of elements are constituted of the same member to form one member that functions as the plurality of elements, or conversely, the function of one member can be shared and realized by the plurality of members.

The power supply device according to the exemplary embodiment is used in various purposes such as a power supply mounted on an electric vehicle such as a hybrid vehicle or an electric vehicle to supply electric power to a running motor, a power supply for storing generated power of natural energy generated by solar power generation, wind power generation or the like, a power supply for storing power at midnight, or others, and is used as a power supply suitable for high power and high current applications.

First Exemplary Embodiment

Figure 2:
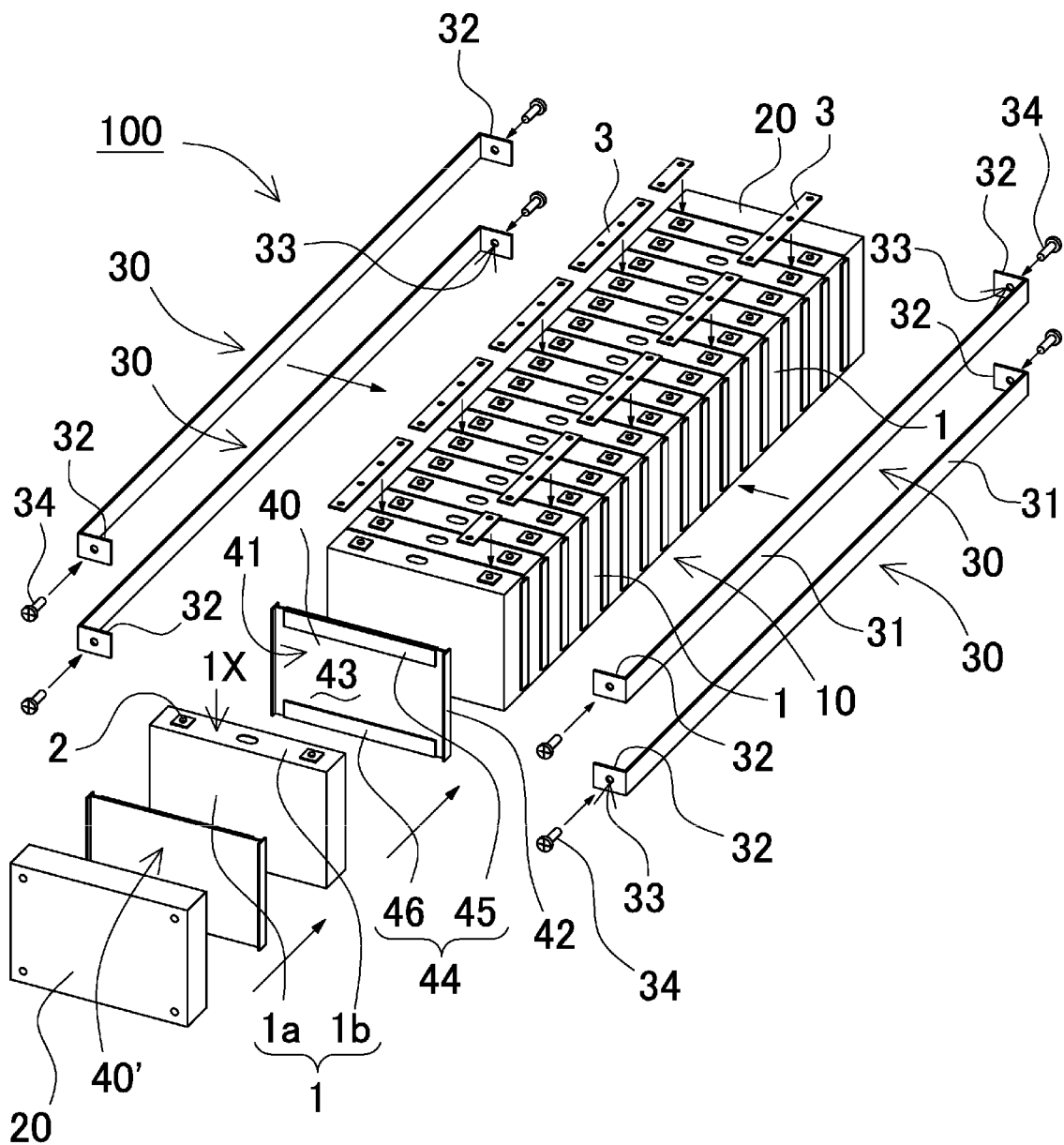
FIG. 2 is an exploded perspective view of the power supply device of FIG. 1.
Figure 3:
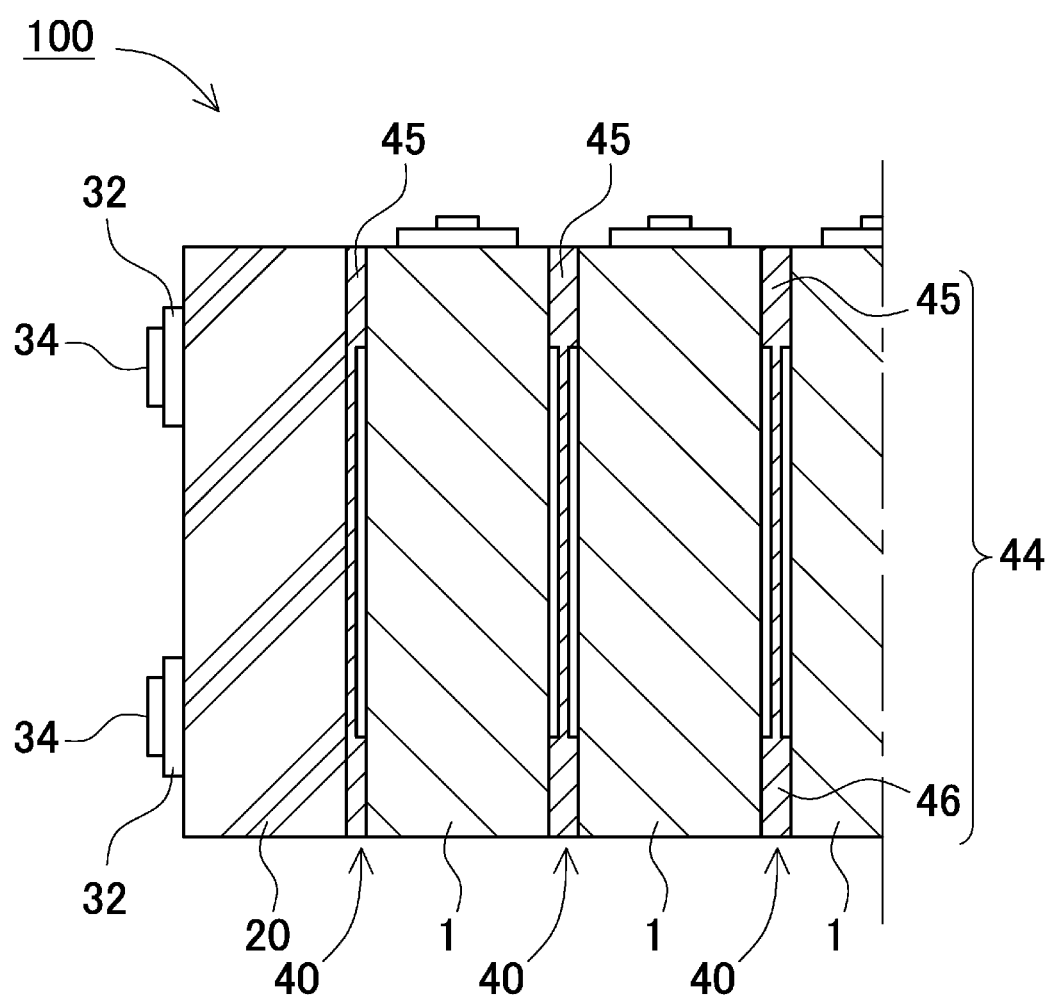
FIG. 3 is a schematic vertical sectional view taken along a line III-III of the power supply device of FIG. 1.

FIG. 1 shows a perspective view of power supply device 100 according to the first exemplary embodiment of the present invention, FIG. 2 shows an exploded perspective view thereof, and FIG. 3 shows a vertical sectional view taken along a line III-III of FIG. 1. Power supply device 100 shown in these drawings includes a plurality of secondary battery cells 1 having positive and negative electrode terminals 2, and bus bars 3 connected to electrode terminals 2 of the plurality of secondary battery cells 1 and connecting the plurality of secondary battery cells 1 in parallel and in series. The plurality of secondary battery cells 1 are connected in parallel or in series via bus bars 3. Secondary battery cell 1 is a rechargeable secondary battery. In power supply device 100, the plurality of secondary battery cells 1 are connected in parallel to form a parallel battery group, and a plurality of parallel battery groups are connected in series to form a large number of secondary battery cells 1 connected in parallel and in series. In power supply device 100 shown in FIGS. 1 to 3, the plurality of secondary battery cells 1 are stacked to form battery stack 10. Further, a pair of end plates 20 are arranged on both end faces of battery stack 10. The ends of fastening members 30 are fixed to both end plates 20, to fix stacked secondary battery cells 1 in a pressed state.

(Secondary Battery Cell 1)

Secondary battery cell 1 is a quadrangular battery having a quadrangular outer shaped main face being a wide face, and whose thickness is made smaller than the width. Further, secondary battery cell 1 is a secondary battery that can be charged and discharged, and is a lithium ion secondary battery. However, the present invention does not specify the secondary battery cell as the quadrangular battery, nor does the present invention specify the lithium ion secondary battery. As the secondary battery cell, all rechargeable batteries such as a non-aqueous electrolyte secondary battery other than the lithium ion secondary battery, and a nickel water secondary battery cell can also be used.

In secondary battery cell 1, an electrode body in which positive and negative electrode plates are stacked is accommodated in exterior can 1a, filled with an electrolytic solution, and airtightly sealed. As shown in FIG. 2, exterior can 1a is formed into a quadrangular cylinder that is closed at the bottom, and an opening at an upper part of exterior can 1a is airtightly closed by metal plate sealing plate 1b. Exterior can 1a is manufactured by deep drawing a metal plate of such as aluminum or aluminum alloy. Similarly to exterior can 1a, sealing plate 1b is made of a metal plate of such as aluminum or aluminum alloy. Sealing plate 1b is inserted into the opening of exterior can 1a, and by irradiating a boundary between the outer periphery of sealing plate 1b and the inner periphery of exterior can 1a with a laser beam, sealing plate 1b is laser welded and airtightly fixed to exterior can 1a.

(Electrode Terminal 2)

In secondary battery cell 1, sealing plate 1b being a top face is used as terminal face 1X, and positive and negative electrode terminals 2 are fixed to both ends of terminal face 1X. Electrode terminal 2 has a columnar protrusion. However, the protrusion does not necessarily have to be columnar, and may be polygonal or elliptical.

Positive and negative electrode terminals 2 fixed to sealing plate 1b of secondary battery cell 1 are positioned such that the positive electrode and the negative electrode become symmetrical. With this configuration, secondary battery cells 1 are flipped horizontally and stacked, and the positive electrode and the negative electrode of electrode terminals 2 that are adjacent to each other are connected by bus bars 3, so that adjacent secondary battery cells 1 can be connected in series.

(Battery Stack 10)

The plurality of secondary battery cells 1 are stacked such that the thickness direction of each secondary battery cell 1 is the stacking direction, to form battery stack 10. In battery stack 10, the plurality of secondary battery cells 1 are stacked such that terminal faces 1X provided with positive and negative electrode terminals 2, or sealing plates 1*b* in FIGS. 2 to 3, are flush with each other.

(Separator 40)

Battery stack 10 has separator 40 interposed between secondary battery cells 1 stacked adjacent to each other. Separator 40 is formed of an insulating material such as resin formed in a thin plate or sheet shape. Separator 40 has a plate shape having a size substantially equal to an opposing face of secondary battery cell 1. Separators 40 are stacked between secondary battery cells 1 adjacent to each other to insulate adjacent secondary battery cells 1 from each other.

Further, in power supply device 100 shown in FIGS. 2 to 3, end plates 20 are arranged on both end faces of battery stack 10. End face separator 40' may also be interposed between the end plate and the battery stack to insulate the two. End face separator 40' can also be formed of the insulating material such as resin formed in the thin plate or sheet shape.

(Bus Bar 3)

In battery stack 10, metal bus bars 3 are connected to positive and negative electrode terminals 2 of adjacent secondary battery cells 1, and the plurality of secondary battery cells 1 are connected in parallel or in series via bus bars 3. In power supply device 100 according to the first exemplary embodiment, in battery stack 10 in which the plurality of secondary battery cells 1 are stacked with each other, electrode terminals 2 of the plurality of secondary battery cells 1 adjacent to each other are connected to each other by bus bars 3 to connect the plurality of secondary battery cells 1 in parallel and in series.

Bus bar 3 is manufactured by cutting and processing a metal plate into a predetermined shape. For the metal plate forming bus bar 3, metal having a low electric resistance and being lightweight can be used, such as aluminum or copper, or an alloy thereof. However, for the metal plate of bus bar 3, other metals or their alloys having a low electric resistance and being lightweight can also be used. Further, a bus bar holder may be arranged between battery stack 10 and bus bars 3. By using the bus bar holder, the plurality of bus bars can be arranged at a fixed position on the upper surface of the battery stack while keeping the plurality of bus bars insulated from each other and keeping the terminal faces of the secondary battery cells insulated from the bus bars.

(End Plate 20)

As shown in FIGS. 1 to 3, end plates 20 are arranged at both ends of battery stack 10 and are fastened using fastening members 30 arranged along both side faces of battery stack 10. End plates 20 are arranged on the outside of end face separators 40', which are both ends in the stacking direction of secondary battery cells 1 of battery stack 10, and sandwich battery stack 10 from both ends.

(End Face Separator 40')

Unlike normal separator 40, end face separator 40' is not interposed between secondary battery cells 1, but is interposed between end plate 20 and secondary battery cell 1. Because the expansion that occurs in secondary battery cell 1 does not need to be considered in end plate 20, the face that opposes end plate 20 among the faces of end face separator 40' does not need to have first protruding face 45 or the like formed, and therefore, can be formed into a second flat face whose entire face is formed flat. On the other hand, the other face of end face separator 40', that is, the face opposing secondary battery cell 1, has first protruding face 45 and flat face 43 formed as in separator 40 described above. However, the above-described separator 40 can be used as it is as a section separator.

(Fastening Member 30)

As shown in FIGS. 1 and 2, fastening members 30 are extended in the stacking direction of battery stack 10, and both ends of fastening members 30 are fixed to end plates 20 arranged on both end faces of battery stack 10, and battery stack 10 is fastened in the stacking direction using end plates 20. Fastening members 30 are metal plates each having a predetermined width and a predetermined thickness and arranged along the side face of battery stack 10, and are arranged so as to oppose both side faces of battery stack 10. A metal plate of such as iron, preferably a steel plate, can be used as fastening member 30. Fastening member 30 made of a metal plate is bent by press molding or the like to form a predetermined shape.

Two fastening members 30 are respectively arranged on the left and right faces of battery stack 10, two fastening members 30 being vertically separated from each other. Each fastening member 30 includes body 31 arranged along the side face of battery stack 10 and fixed parts 32 bent at both ends of body 31 and fixed to the outer side faces of end plates 20. Body 31 is formed in a string shape having a length substantially equal to the length of battery stack 10. In order to fix both ends of fastening member 30 to the pair of end plates 20, both ends thereof are bent along the outer side faces of end plates 20 to provide fixed parts 32. Fastening member 30 is fixed to end plate 20 using fastener 34 inserted into through hole 33 provided at the tip of fixed part 32.

In the example of FIG. 2 and others, two fastening members 30 are respectively arranged on the left and right faces of battery stack 10, two fastening members 30 being vertically separated from each other. However, the present invention is not limited to this configuration, and the number of fastening members may be three or more, or one fastening member may be arranged on the side face of the battery stack. One piece of fastening member can be formed in a size that substantially covers the side face of the battery stack. Further, if necessary, an opening may be formed in the middle portion of the fastening member. Further, the fastening members may be arranged on the left and right sides of the battery stack, or may be arranged on the upper and lower faces.

(Details of Separator 40)

Among the region where separator 40 is in contact with secondary battery cell 1, power supply device 100 is made not easy to deform, that is, made less easily deformable particularly in the region where sealing plate 1*b* of secondary battery cell 1 is in contact with separator 40 than other regions. With this configuration, the joint portion between sealing plate 1*b* and exterior can 1*a* is protected during expansion of secondary battery cell 1, and meanwhile, exterior can 1*a* is allowed to deform in other portions, and therefore, the deformation during expansion can be mitigated.

It is known that in the secondary battery cell, the electrode body accommodated inside the exterior can expands due to charging and discharging and pushes out the exterior can from the inner face, and as a result, the exterior can expands. In particular, in recent years, there has been an increasing demand for higher battery capacity, and the amount of expansion tends to increase accordingly. In the battery stack in which a large number of pieces of secondary battery cells are stacked, the total amount of expansion also increases according to the number of cells.

On the other hand, in the battery stack, the secondary battery cells and the separators are alternately stacked, and the end plates are arranged on both end faces and are fastened with fastening members such as bind bars. By fastening the end plates tightly to each other with the fastening members, it becomes possible to prevent the secondary battery cells from being vertically displaced or falling out.

Figure 20:
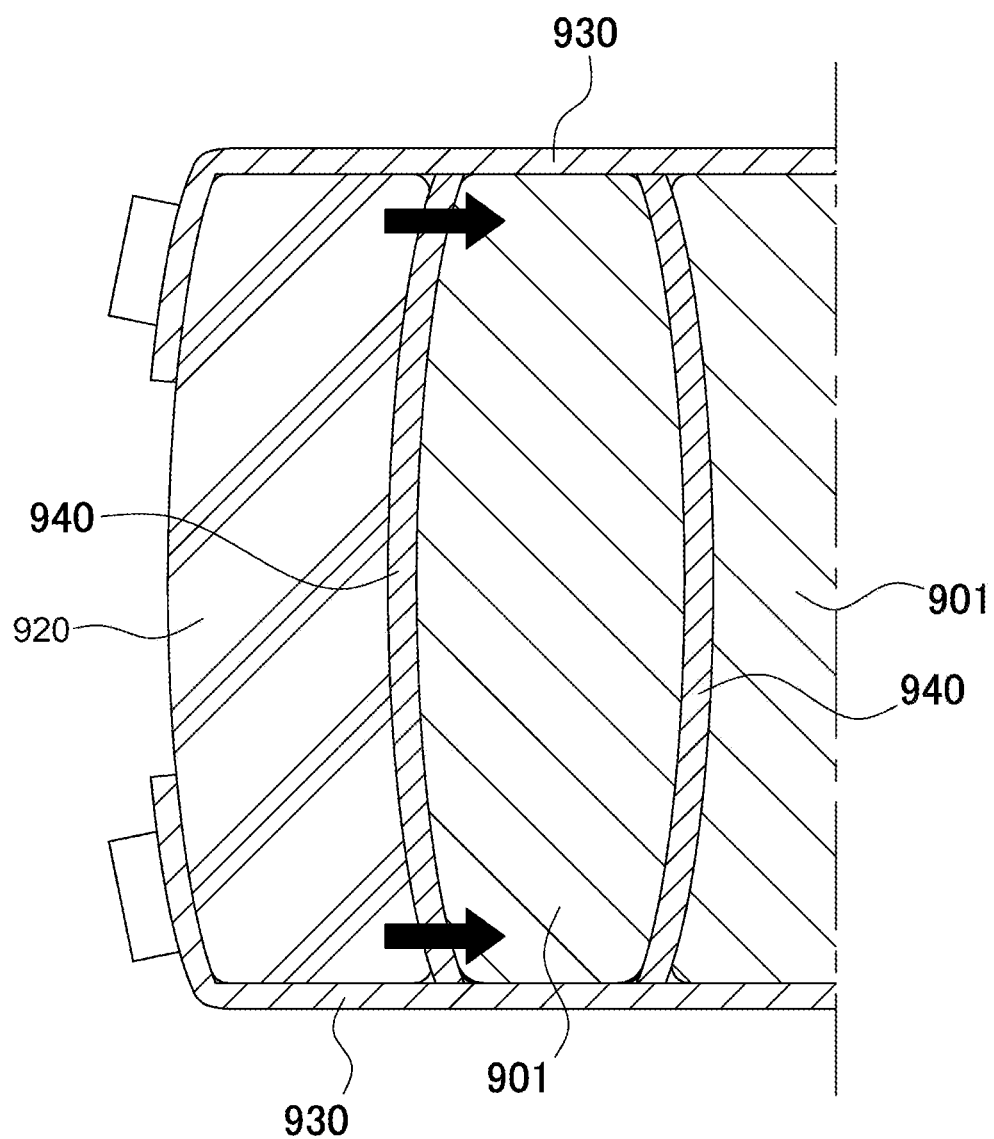
FIG. 20 is a schematic horizontal sectional view showing a battery stack in which a secondary battery cell is expanded in the power supply device of FIG. 17.

When the secondary battery cell expands in this state, the middle portion of end plate 920 located on the end face is pushed outward by secondary battery cell 901 as shown in FIG. 20, but both ends are pulled by bind bars 930, resulting in an arched and warped state (FIG. 20 shows the amount of deformation emphasized for explanation). As a result, corners of the end edge of the end plate 920 warp and protrude toward secondary battery cell 901, causing the end edge of secondary battery cell 901 to be strongly pushed. Strong stress is concentrated in this state on the side face of secondary battery cell 901. In order to prevent this, a structure that can absorb deformation is required so as to prevent the stress from being concentrated on a specific part during expansion.

On the other hand, when the exterior can of the secondary battery cell expands, the welded portion with the sealing plate may come off. That is, in general, a quadrangular exterior can of a secondary battery cell has an opening at the upper face, and after a current collector or the like is introduced from this opening, the opening end is sealed with a sealing plate and the joint interface is welded by laser welding or the like.

However, if the exterior can repeatedly expands, the laser welded portion between the opening end face of the exterior can and the sealing plate may be broken. In order to prevent this, it has been necessary to protect this portion to prevent the joint interface between the exterior can and the sealing plate from being separated. This is nothing more than preventing or restricting the expansion of the exterior can, and is an approach opposite to the above-described approach of allowing the deformation.

As described above, the power supply device is required to have contradictory characteristics of deformation allowance and regulation, and it has not been easy to achieve both of the above. On the other hand, in power supply device 100 according to the present exemplary embodiment, a configuration is adopted such that easiness to deform, that is, easy deformability at the joint portion between separator 40 and secondary battery cell 1 is partially changed, in other words, the configuration in which rigidity is made non-uniform is adopted.

Figure 4:
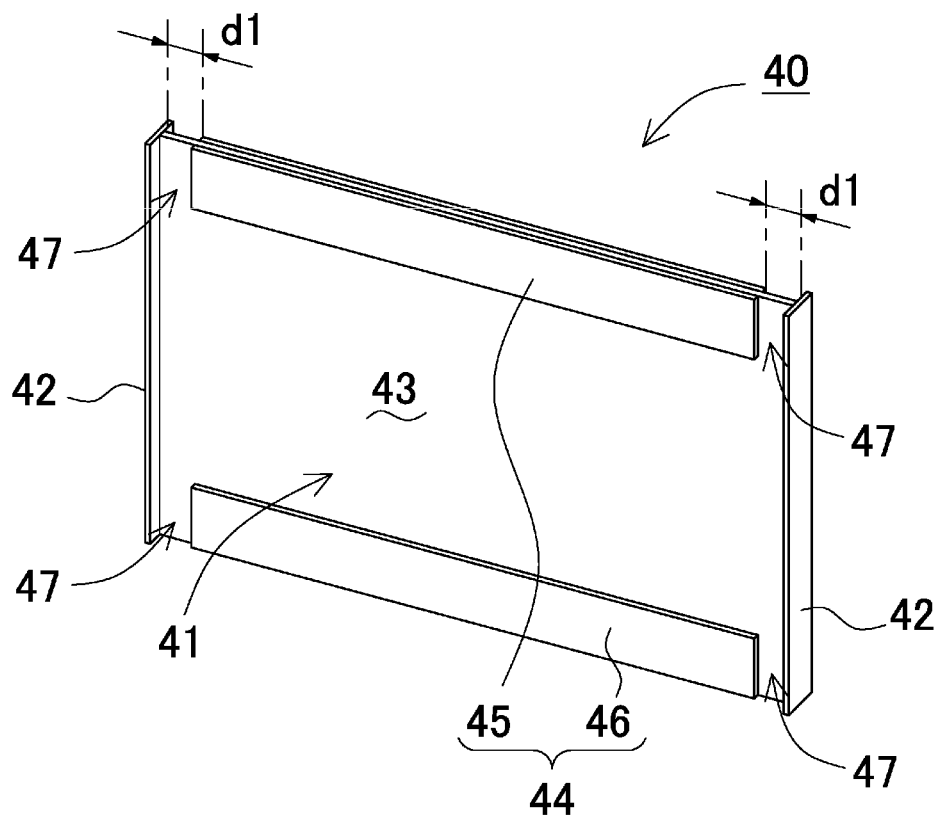
FIG. 4 is a perspective view showing a separator of FIG. 2.

Specifically, FIG. 4 shows a perspective view of separator 40 according to the first exemplary embodiment. Separator 40 shown in this drawing includes main face 41 forming a main face and guides 42 formed on both side faces of main face 41.

Guide 42 is formed in a wall shape that protrudes toward the front and back of main face 41 on the side face of main face 41. When secondary battery cells 1 and separators 40 are alternately stacked, guides 42 are configured to cover the side faces of secondary battery cells 1 using guides 42 of separators 40 respectively arranged on the front face and the rear face of secondary battery cells 1.

Main face 41 forms flat face 43 that is flat and also forms protruding faces 44 at upper and lower portions. In the example of FIG. 4, protruding face 44 has first protruding face 45 formed on the upper side of main face 41 and second protruding face 46 formed on the lower side thereof. First protruding face 45 and second protruding face 46 protrude slightly from the flat portion and are formed in a slip shape extending in the lateral direction. The amount of protrusion of the protruding face is, for example, 0.05 mm to 1 mm, preferably 0.1 to 0.8 mm, and more preferably about 0.6 mm. Further, first protruding face 45 and second protruding face 46 are preferably molded integrally with separator 40.

Separator 40 is made of material having excellent insulation properties and heat resistance. Separator 40 can be mass-produced at low cost using engineering plastics such as polycarbonate and polybutylene terephthalate (PBT) resin. Alternatively, separator 40 can be manufactured from a resin having excellent heat resistance, a thermoplastic resin such as polyphenylene sulfide (PPS), polypropylene, nylon, polyethylene terephthalate (PET), polyvinylidene chloride, or polyvinylidene fluoride, or a thermosetting resin such as polyimide, fluororesin, diallyl phthalate resin (PDAP), silicon resin, or epoxy resin.

Further, as shown in the vertical sectional view of FIG. 3, first protruding face 45 is provided so as to overlap with or be located near the portion where sealing plate 1b of secondary battery cell 1 is joined.

(First Step 47)

On the other hand, first protruding face 45 forms first steps 47 between the side faces in the longitudinal direction thereof and the end edge of upper face side of separator 40. In other words, first protruding face 45 is not extended up to guide 42 and a portion lower than first protruding face 45 is provided to form a space between separator 40 and secondary battery cell 1. In the example of FIG. 4, flat face 43 of main face 41 is continuous from the left to the right of first protruding face 45. With this configuration, a situation in which stress is concentrated near the side face of exterior can 1a can be avoided during expansion of secondary battery cell 1, and it becomes possible to improve reliability by protecting exterior can 1a.

Figure 5:
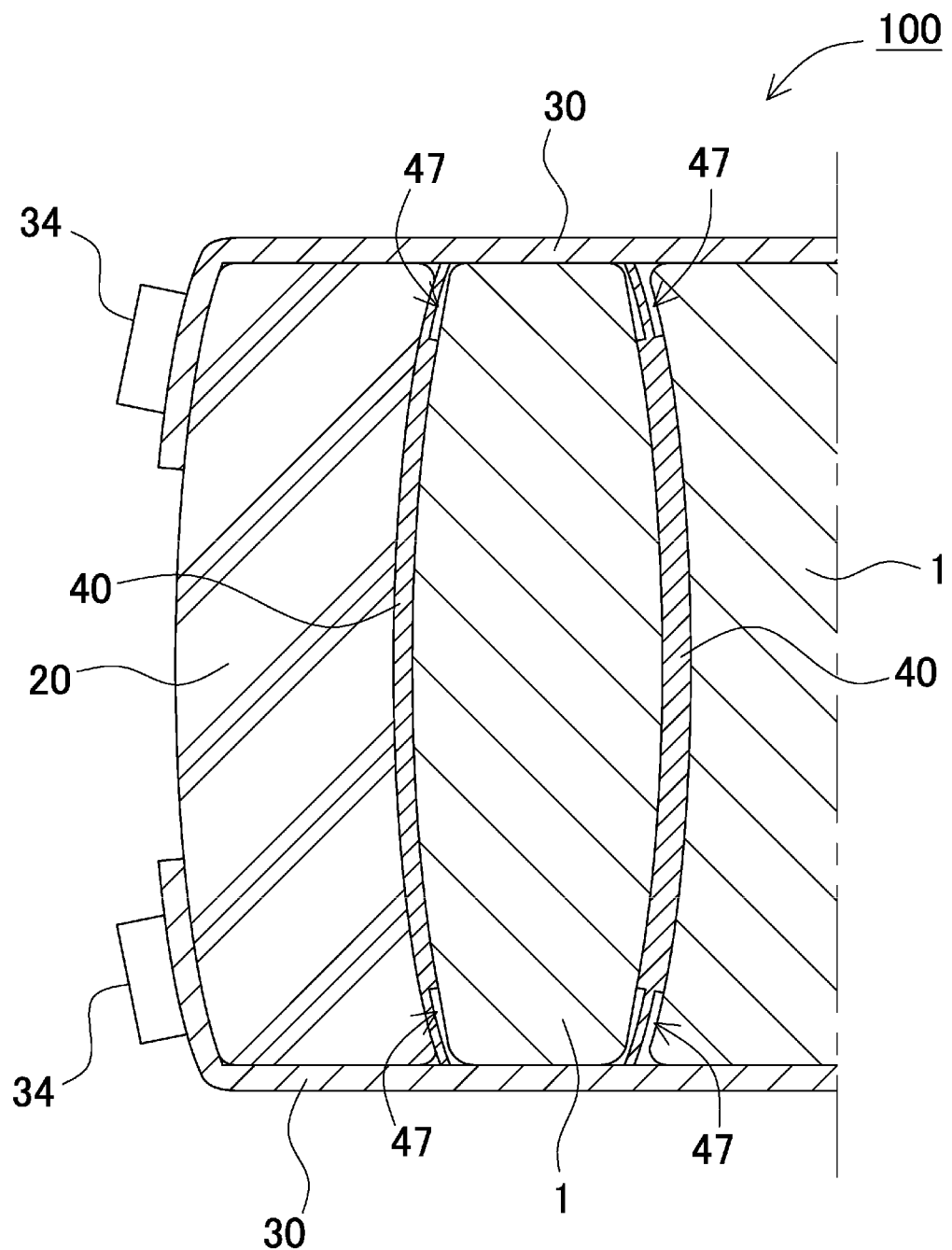
FIG. 5 is a schematic horizontal sectional view taken along a line V-V of the power supply device of FIG. 1 and showing a state in which a secondary battery cell is expanded.

That is, when secondary battery cell 1 expands, as shown in the horizontal sectional view of FIG. 20, the trunk portion of exterior can 1a protrudes, and as a result, as a reaction of the other adjacent secondary battery cells and end plate 920 warping, the corners of these other secondary battery cells and end plate 920 protrude toward secondary battery cell 901. In other words, the corners of expanded secondary battery cell 901 are pushed from the surroundings, stress is concentrated on the corners, and exterior can 1a may be damaged. Therefore, in the present exemplary embodiment, as described above, while first protruding face 45 is formed, first steps 47 are formed on the left and right sides thereof. As a result, as shown in a horizontal sectional view of FIG. 5, the stress concentration on the corners of exterior can 1a is relaxed, and secondary battery cell 1 is protected.

Second Exemplary Embodiment

Figure 6:
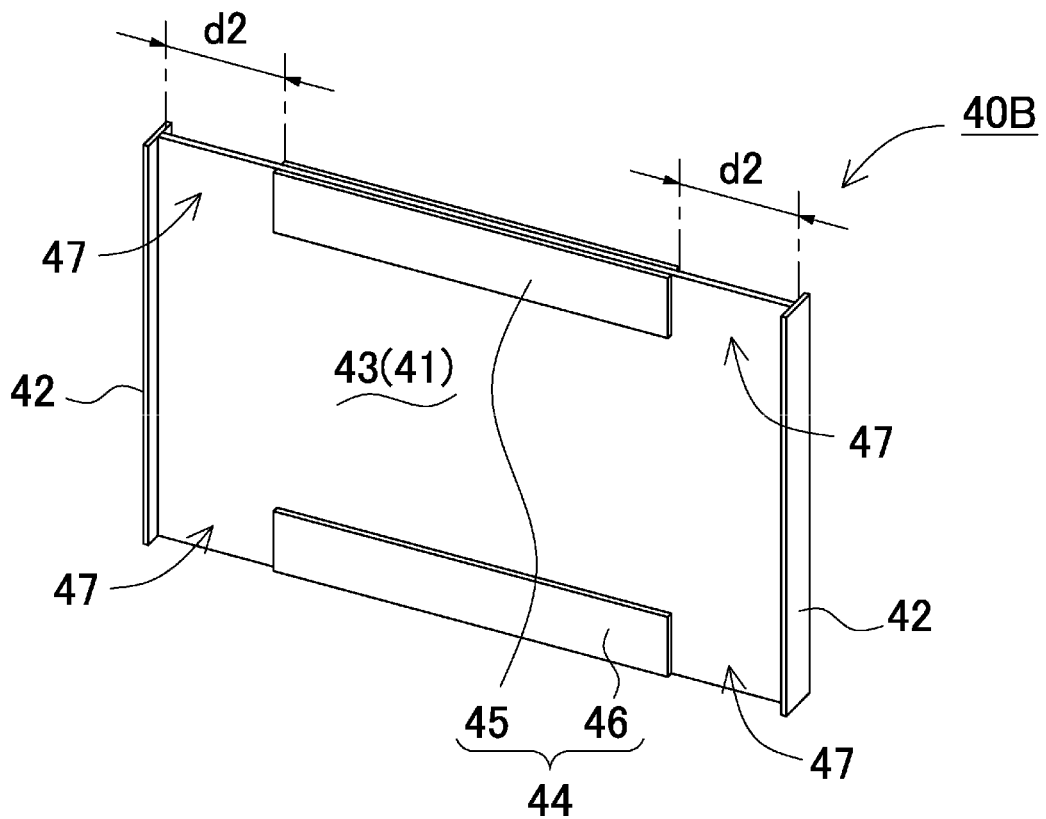
FIG. 6 is a perspective view showing a separator of a power supply device according to a second exemplary embodiment.

Width d1 of first step 47 is designed according to an expected amount of expansion of the exterior can, material (plasticity) of the exterior can, and the like. It is desirable to set the width larger for secondary battery cell 1 having a larger amount of deformation. For example, with respect to width W of separator 40, for example, width d1 is set to 0.05 W≤d1≤0.3 W, preferably 0.1 W≤d1≤0.2 W. FIG. 6 shows separator 40B of the power supply device according to the second exemplary embodiment. In separator 40B, width d2 of first step 47 is wider than that of the first exemplary embodiment, which enables secondary battery cell 1 having a larger amount of deformation than the first exemplary embodiment to respond to the deformation.

(Second Protruding Face 46)

Further, in the above example, by providing second protruding face 46 on the bottom face side of separator 40 in addition to first protruding face 45, not only the opening end side to which sealing plate 1b of exterior can 1a is welded but also the bottom plate side can also be protected. Second protruding face 46 is preferably designed to have the same protruding height as first protruding face 45. Further, the width of second protruding face 46, in other words, the width of the second steps formed on the left and right sides of second protruding face 46 can be set to the same size as that of first protruding face 45. However, depending on secondary battery cell 1, the protruding height and length of second protruding face 46 may be different from those of first protruding face 45.

Third Exemplary Embodiment

Figure 7:
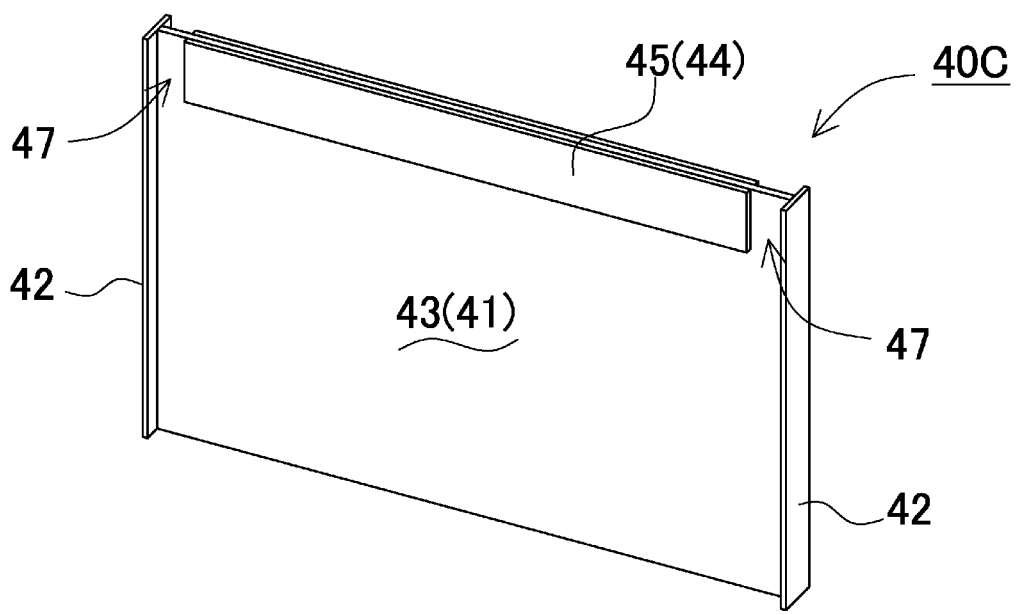
FIG. 7 is a perspective view showing a separator of a power supply device according to a third exemplary embodiment.

On the other hand, it can be said that the risk of fracture of the bottom surface side of exterior can 1a integrally formed by squeezing or the like is lower than the risk of fatigue fracture of sealing plate 1b. From this point of view, the second protruding face can be omitted. FIG. 7 shows, as an example of this, a perspective view of separator 40C of the power supply device according to the third exemplary embodiment. In separator 40C shown in this drawing, only first protruding face 45 is provided on the upper side of flat face 43 of main face 41, and the second protruding face is not provided on the lower side. By using the above separator 40C, the welded portion of sealing plate 1b can be effectively prevented from breaking.

Fourth Exemplary Embodiment

Figure 8:
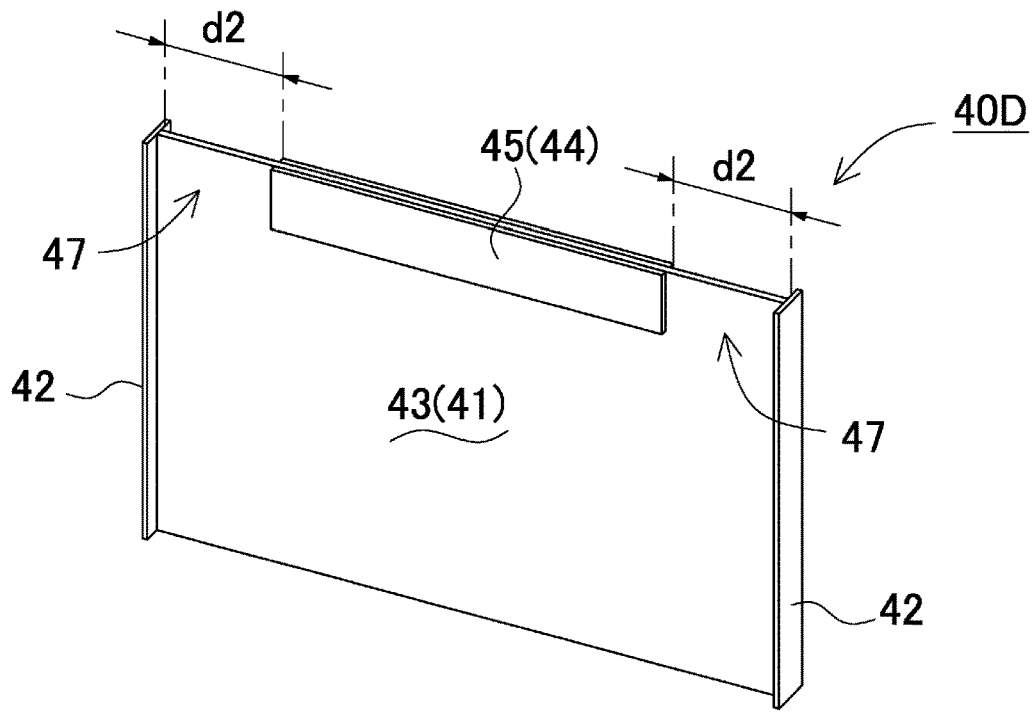
FIG. 8 is a perspective view showing a separator of a power supply device according to a fourth exemplary embodiment.

Further, it is needless to say that width d1 of first protruding face 45 can be appropriately adjusted as described above even in the configuration in which only first protruding face 45 is provided. FIG. 8 shows, as an example, separator 40D of the power supply device according to the fourth exemplary embodiment, in which the width of first protruding face 45 is shortened to have width d2.

Fifth Exemplary Embodiment

Figure 9:
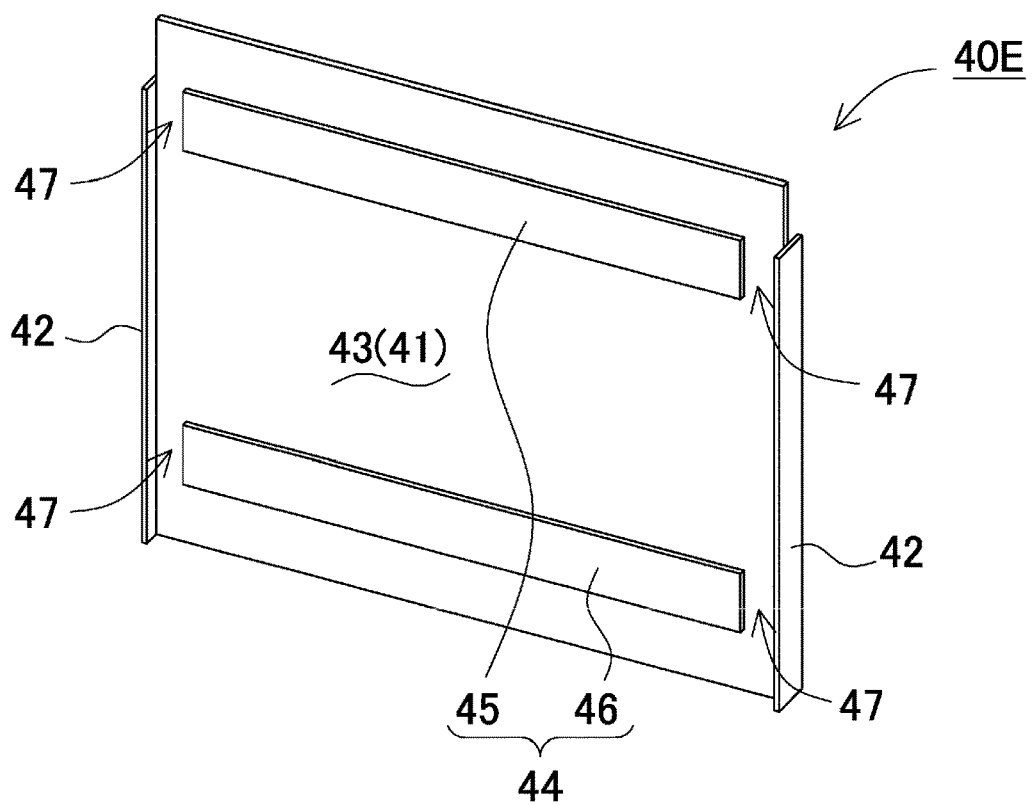
FIG. 9 is a perspective view showing a separator of a power supply device according to a fifth exemplary embodiment.

Further, first protruding face 45 does not necessarily have to be provided along the upper end of separator 40, and the position where the first protruding face is provided can be optionally adjusted according to the size and position of the secondary battery cell in contact with the separator. That is, the shape of the separator can be made larger than that of the secondary battery cell, and the secondary battery cell does not always need to be fixed to the upper end of the separator. By arranging the first protruding face in or near the region where the sealing plate is located, in a state of the secondary battery cell and the separator being stacked, the fixed portion of the sealing plate can be protected. FIG. 9 shows, as an example, a perspective view of separator 40E of the power supply device according to the fifth exemplary embodiment. In this example, first protruding face 45 is provided at a position slightly separated from the upper end of flat face 43 of main face 41. In this way, the position of arranging the first protruding face is determined to be at a position where the sealing plate can be effectively protected, according to the shape and size of the secondary battery cell and the separator.

Sixth Exemplary Embodiment

Figure 10A:
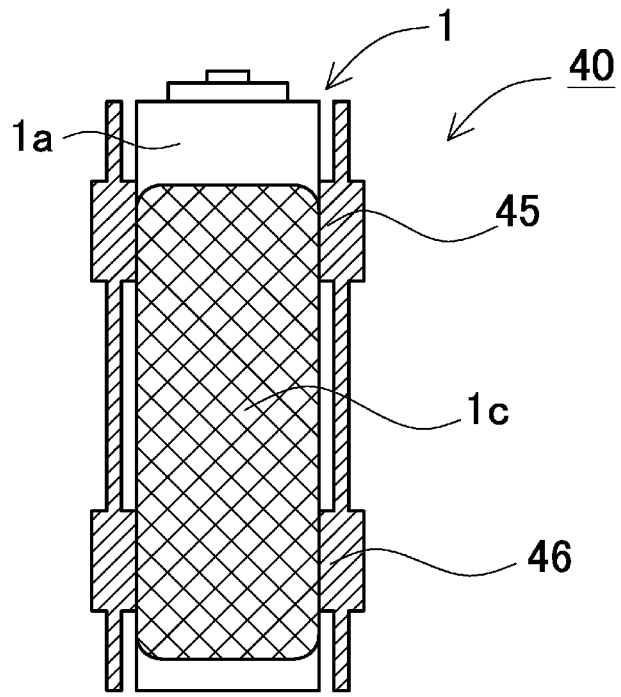
FIG. 10A is a vertical sectional view of a main part of a power supply device according to a sixth exemplary embodiment.
Figure 10B:
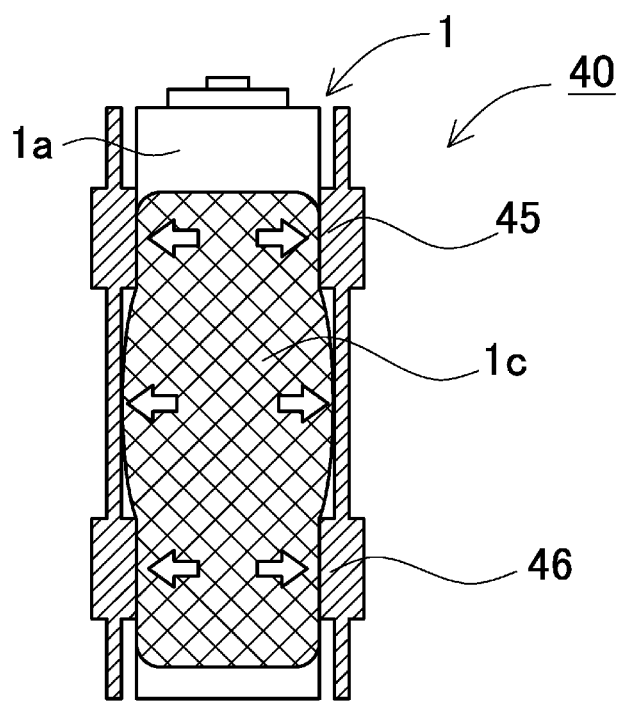
FIG. 10B is a vertical sectional view of the main part showing a state in which a secondary battery cell of FIG. 10A is expanded.

In the above example, there has been described the case of providing first protruding face 45 near sealing plate 1b to protect the welded portion of sealing plate 1b of exterior can 1a. However, the present invention is not limited to this configuration, and the first protruding face may be arranged at or near the position of the upper part of the current collector that causes expansion inside the secondary battery cell. An example as such is described with reference to FIGS. 10A to 10B. As shown in these drawings, the reason that secondary battery cell 1 expands is because current collector 1c accommodated inside exterior can 1a expands due to charging and discharging. Therefore, by locating first protruding face 45 so as to correspond to the upper part of current collector 1c, the deformation of the secondary battery cell is suppressed in this portion, and it becomes possible to suppress the situation in which the welded portion of sealing plate 1b located above this portion from being deformed and fractured by fatigue.

Seventh Exemplary Embodiment

Figure 11:
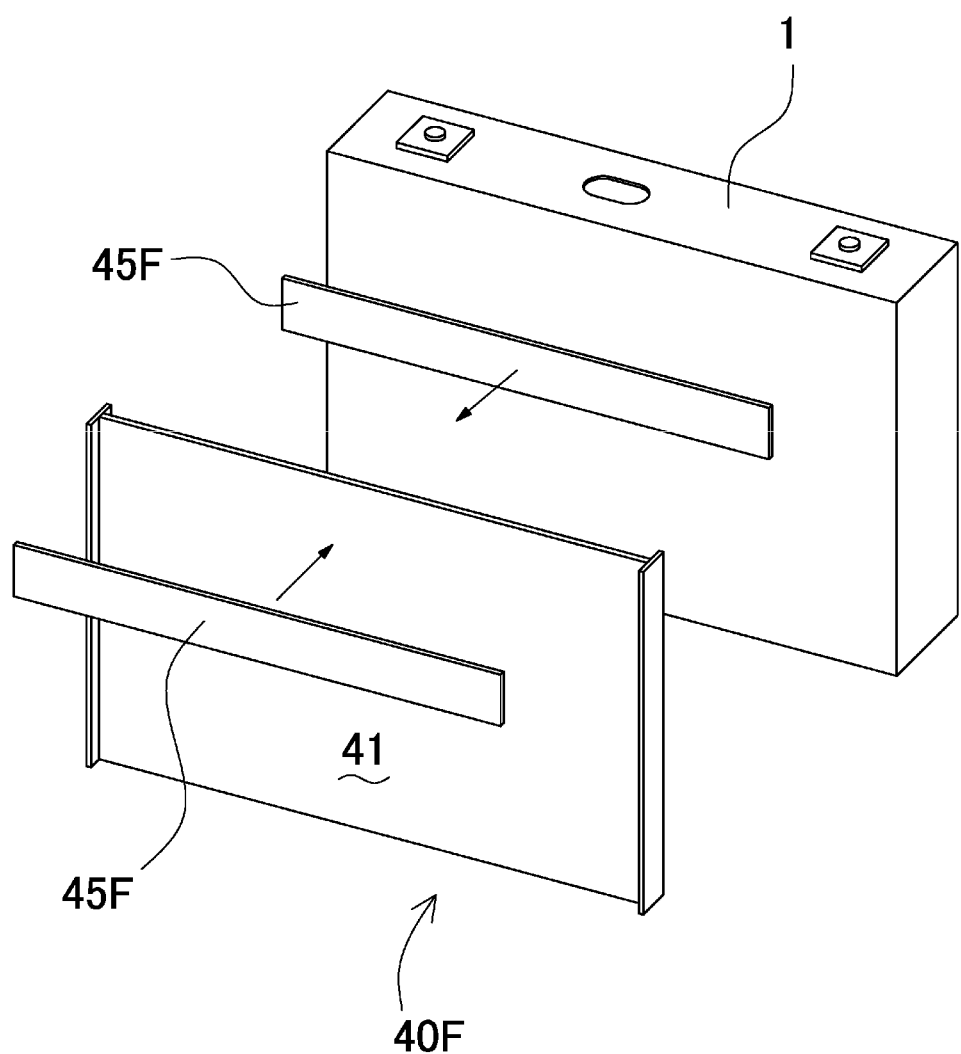
FIG. 11 is an exploded perspective view showing a separator of a power supply device according to a seventh exemplary embodiment.

Further, in the above example, the case of integrally molding first protruding face 45 and second protruding face 46 with separator 40 has been described. However, the present invention is not limited to the configuration in which the first protruding face and the second protruding face are integrally molded with the separator, and these protruding faces may be constituted of separate members. For example, FIG. 11 shows a perspective view of separator 40F of the power supply device according to the seventh exemplary embodiment. In this example, first protruding faces 45F are pasted to the upper part of separator 40F constituted of flat plate-shaped main face 41. First protruding face 45F is formed of a resin plate or sheet in advance, and is fixed to separator 40F with double-sided tape or by bonding. Alternatively, a bonding agent may be applied in advance to the rear face of first protruding face 45F. Further, a heat-resistant and insulating tape material itself can be pasted to separator 40F and used as first protruding face 45F. According to this configuration, by utilizing the existing separator and pasting the first protruding face having a desired length to an appropriate position, a resistance function exerted during expansion of secondary battery cell can be added.

Eighth Exemplary Embodiment

Figure 12:
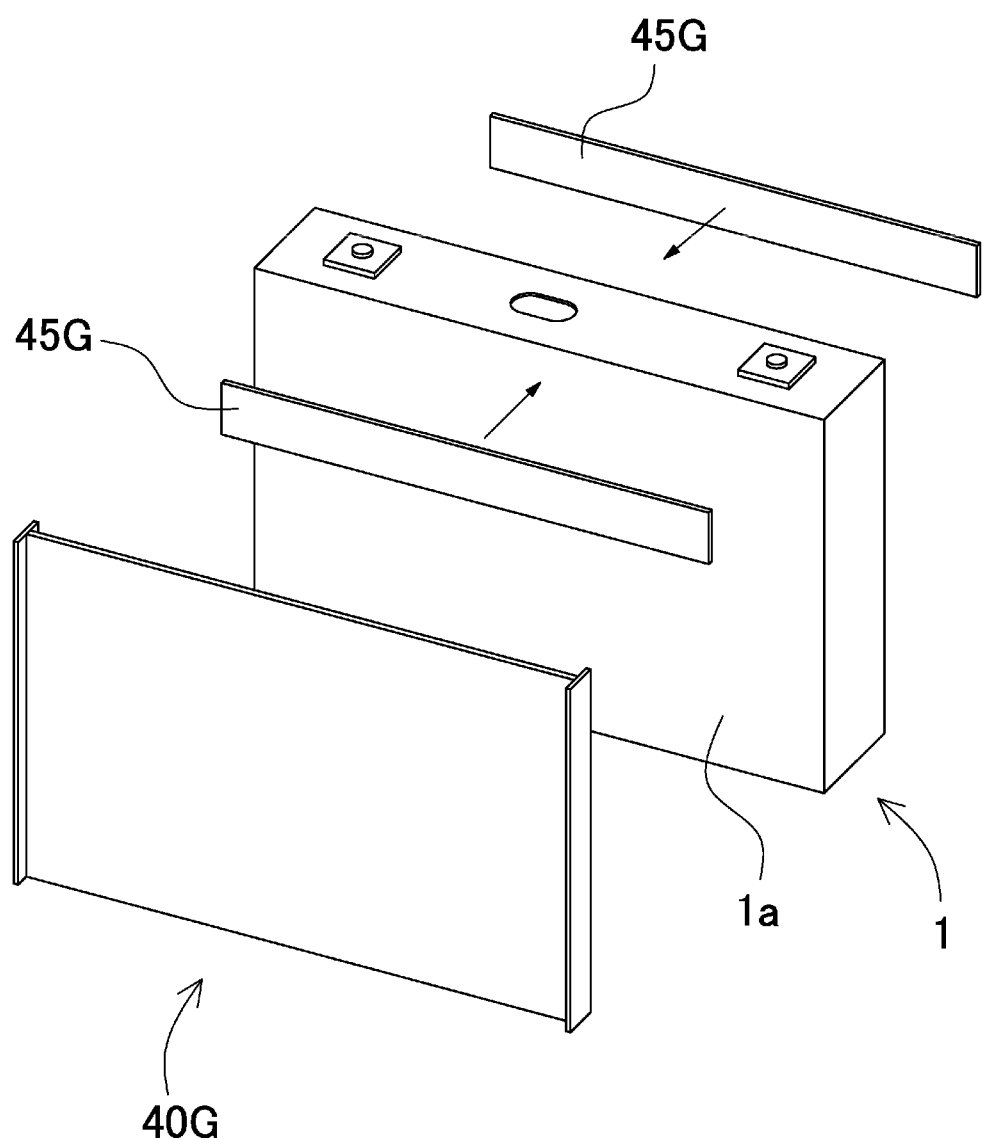
FIG. 12 is an exploded perspective view showing a secondary battery cell of a power supply device according to an eighth exemplary embodiment.

Furthermore, in the above example, there has been described the case of adjusting, on separator 40 side, the easy deformability in the region where separator 40 is in contact with the side of sealing plate 1b of the secondary battery cell. However, the present invention is not limited to this configuration, and the easy deformability in the region where the separator is in contact with the sealing plate side of the secondary battery cell can be adjusted on the secondary battery cell side. As the example as such, FIG. 12 shows an exploded perspective view of a battery stack of the power supply device according to the eighth exemplary embodiment. In the battery stack shown in this drawing, first protruding faces 45G are pasted to the surface of exterior can 1a of secondary battery cell 1. Even with this configuration, the amount of deformation during expansion of secondary battery cell 1 is suppressed by first protruding face 45G interposed in the region where separator 40G is in contact with the side of sealing plate 1b of secondary battery cell 1, and therefore, the effect of protecting the joint site of sealing plate 1b can be obtained.

Further, in the above example, there has been described a configuration of relatively lowering the easy deformability of the region where separator 40 is in contact with the side of sealing plate 1b of secondary battery cell 1 as compared with the other regions by adding first protruding face 45. However, the adjustment of easy deformability can be realized not by the shape but by the difference in material. For example, the same effect can be achieved by using a composite material as the material of the separator such that the hardness is high on the sealing plate side and the hardness is low in other regions. For example, by forming a separator by combining a plurality of members of different materials, that is, different hardness, a structure having the above-described partially different hardness can be provided.

The above power supply device can be used as a vehicle-mounted power supply. As a vehicle equipped with a power supply device, an electric vehicle such as a hybrid vehicle or a plug-in hybrid vehicle that runs on both an engine and a motor, or an electric vehicle that runs only with a motor can be used, and the power supply device is used as a power supply for these vehicles. In addition, an example in which large-capacity and high-output power supply device 100 is constructed is described, the power supply device being constituted by connecting a large number of the above-described power supply devices in series or in parallel and adding a necessary control circuit in order to obtain the electric power for driving the vehicle.

(Power Supply Device for Hybrid Vehicle)

Figure 13:
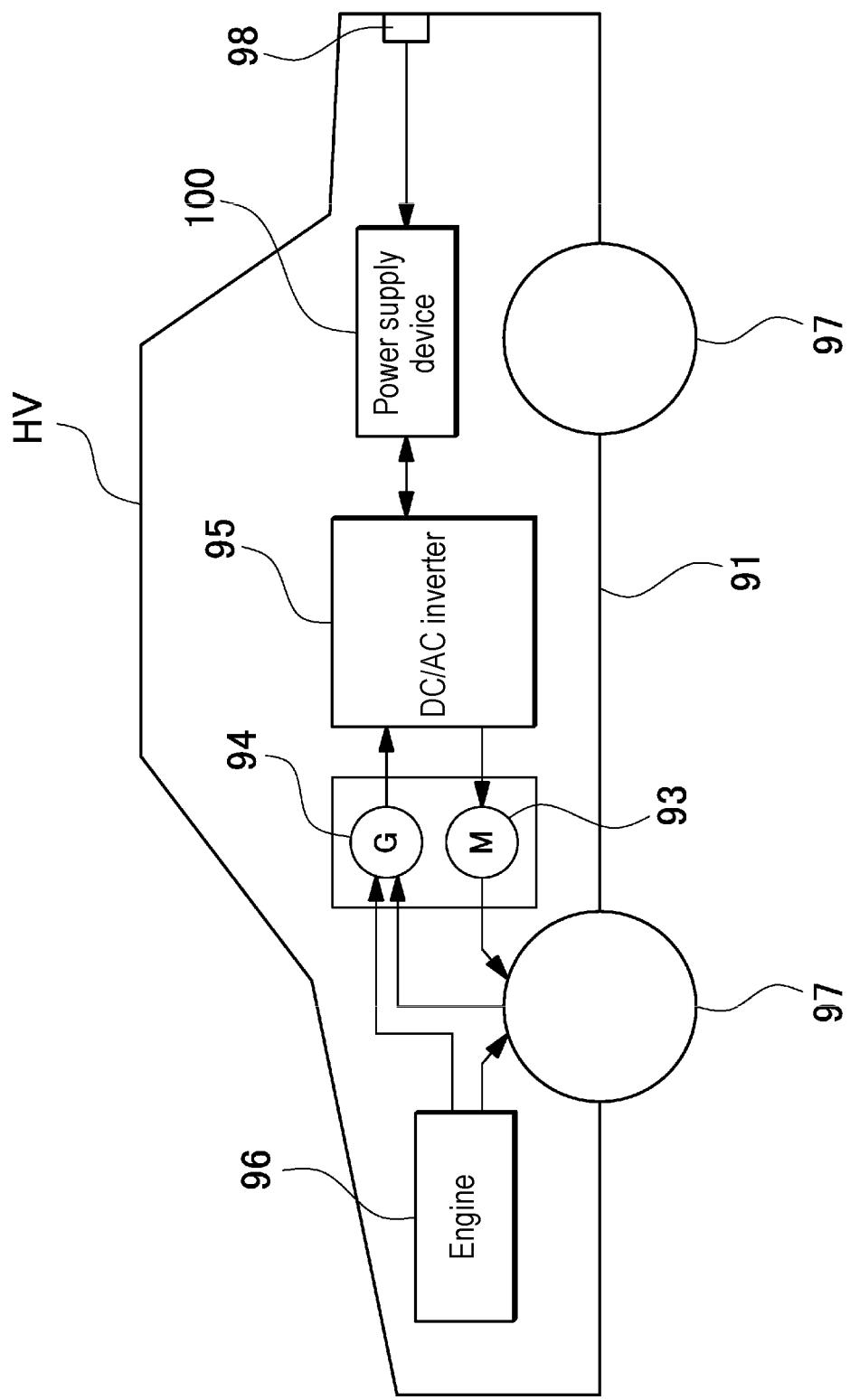
FIG. 13 is a block diagram showing an example in which a power supply device is mounted on a hybrid vehicle that runs on an engine and a motor.

FIG. 13 shows an example in which a power supply device is mounted on a hybrid vehicle that runs on both an engine and a motor. Vehicle HV mounted with the power supply device shown in this drawing includes vehicle body 91, engine 96 and running motor 93 for running vehicle body 91, wheels 97 driven by engine 96 and running motor 93, power supply device 100 that supplies electric power to motor 93, and generator 94 that charges a battery of power supply device 100. Power supply device 100 is connected to motor 93 and generator 94 via direct current to alternating current (DC/AC) inverter 95. Vehicle HV runs on both motor 93 and engine 96 while charging and discharging the battery of power supply device 100. Motor 93 is driven to run the vehicle in a region where the engine efficiency is low, for example, when accelerating or running at a low speed. Motor 93 is driven by being supplied with electric power from power supply device 100. Generator 94 is driven by engine 96 or by regenerative braking when the vehicle is braked to charge the battery of power supply device 100. As shown in FIG. 13, vehicle HV may be provided with charging plug 98 for charging power supply device 100. By connecting this charging plug 98 to an external power supply, power supply device 100 can be charged.

(Power Supply Device for Electric Vehicle)

Figure 14:
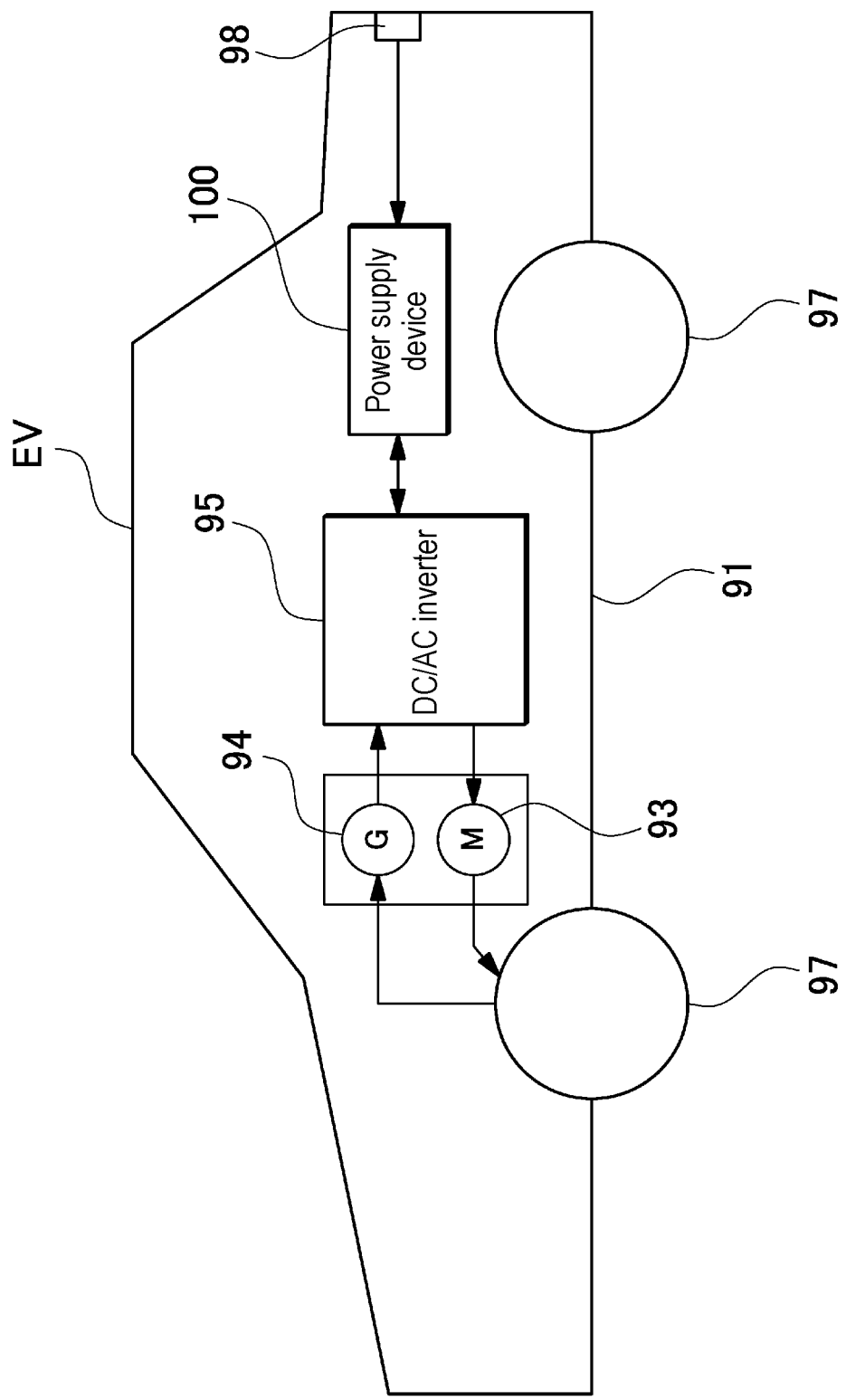
FIG. 14 is a block diagram showing an example in which a power supply device is mounted on an electric vehicle that runs only on a motor.

Further, FIG. 14 shows an example in which a power supply device is mounted on an electric vehicle that runs only on a motor. The vehicle EV mounted with the power supply device shown in this drawing includes vehicle body 91, running motor 93 for running vehicle body 91, wheels 97 driven by motor 93, and power supply device 100 that supplies electric power to motor 93, and generator 94 that charges the battery of power supply device 100. Power supply device 100 is connected to motor 93 and generator 94 via direct current to alternating current (DC/AC) inverter 95. Motor 93 is driven by being supplied with electric power from power supply device 100. Generator 94 is driven by the energy used for regenerative braking of vehicle EV to charge the battery of power supply device 100. In addition, vehicle EV is equipped with charging plug 98, and charging plug 98 can be connected to an external power supply to charge power supply device 100.

(Power Storage System)

Figure 15:
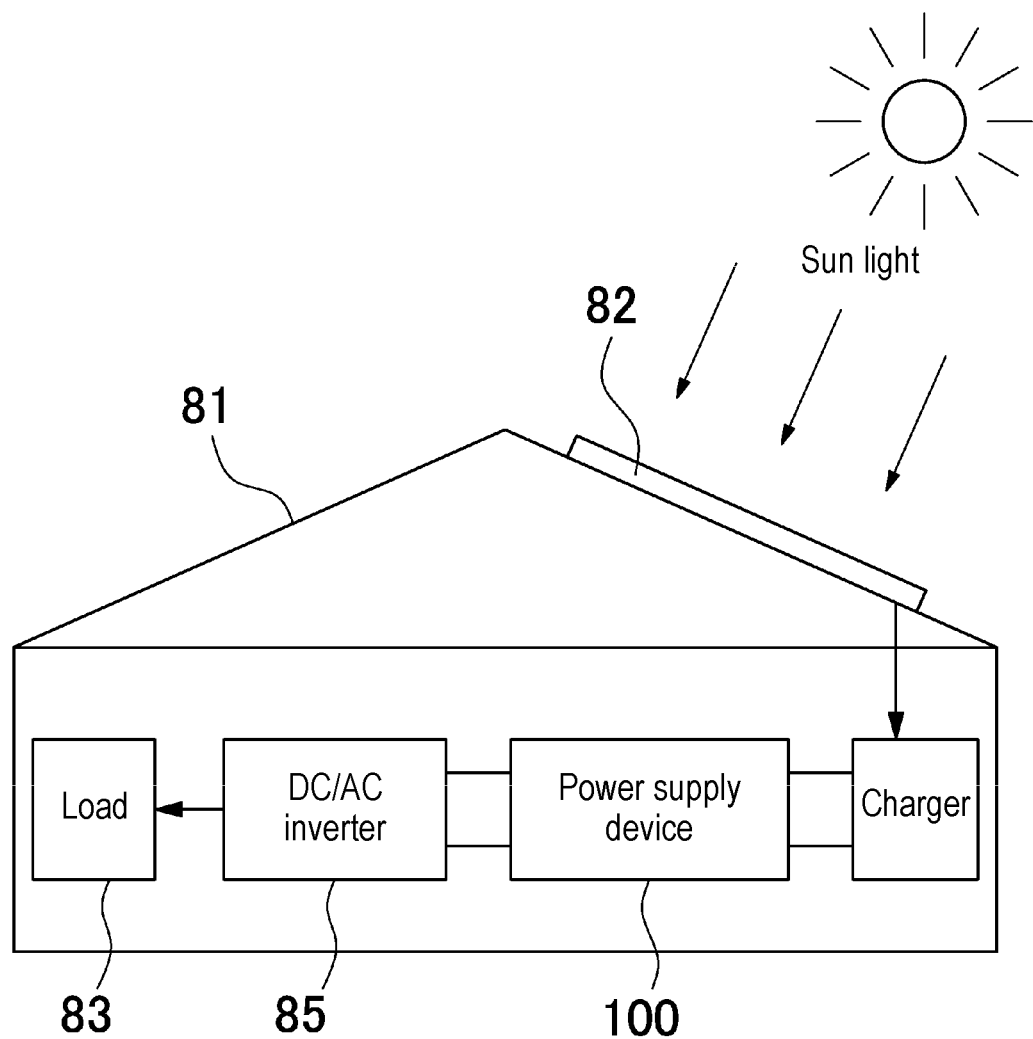
FIG. 15 is a block diagram showing an example applied to a power supply device for storing power.
Figure 16:
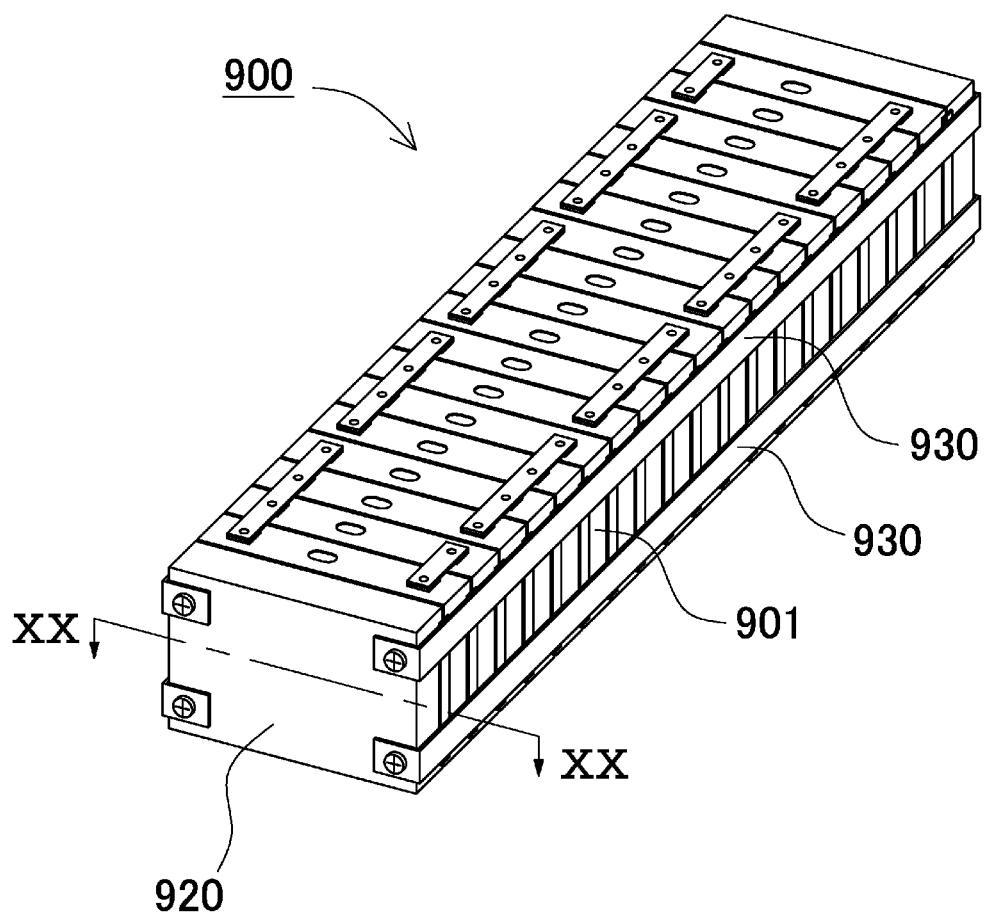
FIG. 16 is a perspective view showing a conventional power supply device.
Figure 17:
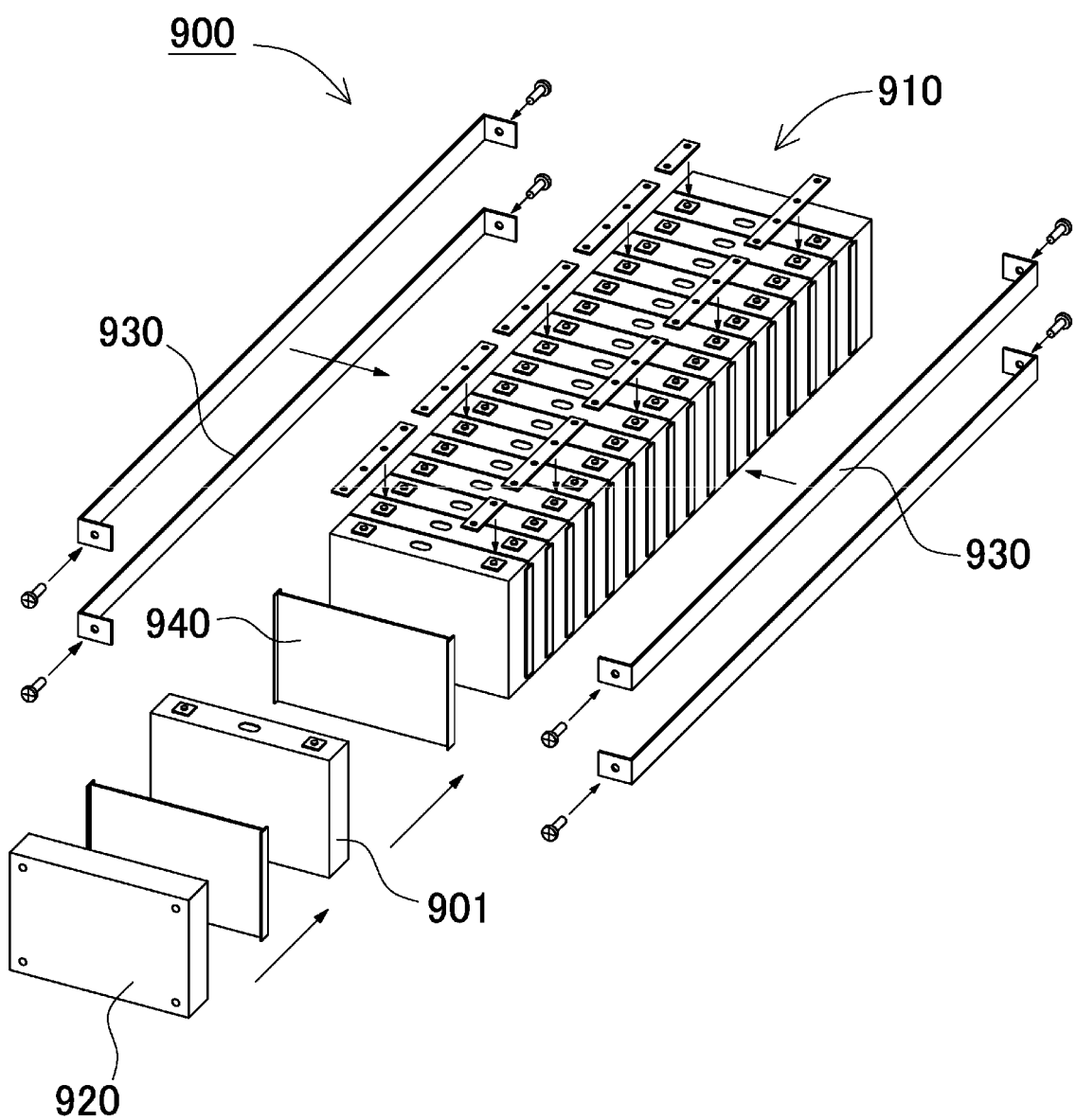
FIG. 17 is an exploded perspective view showing the power supply device of FIG. 16.
Figure 18:
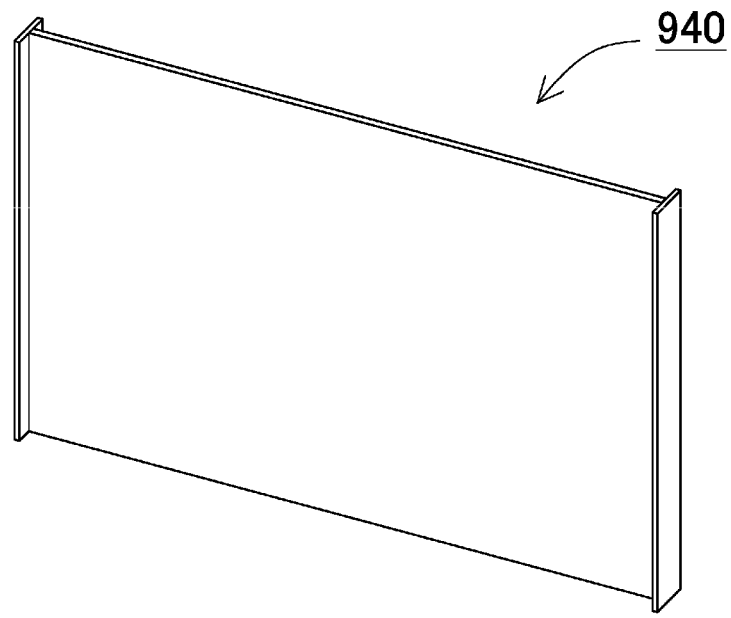
FIG. 18 is a perspective view showing a separator of FIG. 18.
Figure 19:
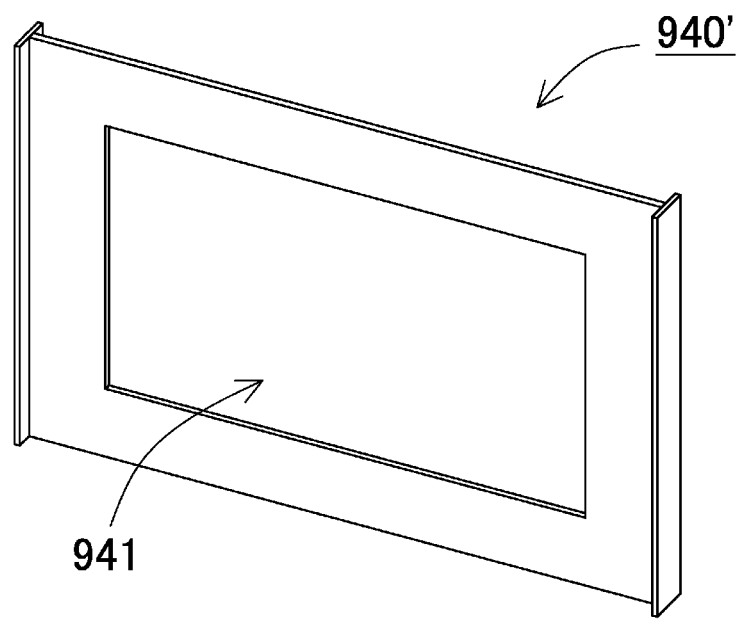
FIG. 19 is a perspective view showing an example of another separator.

Furthermore, the present invention does not specify the use of the power supply device as the power supply of the motor that runs the vehicle. The power supply device according to each exemplary embodiment can also be used as a power supply for a power storage system that charges a battery and stores power with electric power generated by solar power generation, wind power generation, or the like. FIG. 15 shows a power storage system in which a battery of power supply device 100 is charged with a solar cell to store power. As shown in the drawing, the power storage system shown in this drawing charges the battery of power supply device 100 with electric power generated by solar cell 82 arranged on the roof or the roof floor of building 81 such as a house or a factory. Furthermore, this power storage system supplies the electric power stored in power supply device 100 to load 83 via DC/AC inverter 85.

Further, although not shown, the power supply device can also be used as a power supply of a power storage system that charges a battery and stores power by utilizing midnight power at night. The power supply device that is charged with the midnight power can limit the peak power during the daytime to a small value by performing charging with the midnight power that is the surplus power of the power plant, and outputting the power during the daytime when the power load increases. Furthermore, the power supply device can also be used as a power supply that performs the charging with both the output of the solar cell and the midnight power. This power supply device can effectively utilize both electric power generated by a solar cell and midnight electric power, and can efficiently store power in consideration of weather and power consumption.

The power storage system as described above can be suitably used in applications including a backup power supply device that can be installed in a rack of a computer server, a backup power supply device for a wireless base station for a mobile phone or the like, a power storage power supply for use in a house or a factory, a street light power supply or the like, a power storage device combined with a solar cell, and a backup power supply for traffic lights and traffic indicators on roads.

INDUSTRIAL APPLICABILITY

The power supply device according to the present invention and a vehicle equipped with the power supply device are suitably used as a large current power supply used for a power supply of a motor for driving an electric vehicle such as a hybrid vehicle, a fuel cell vehicle, an electric vehicle, or an electric motorcycle. As an example, a power supply device for a plug-in hybrid electric vehicle that can switch between an electric vehicle (EV) running mode and a hybrid electric vehicle (HEV) running mode, a hybrid type electric vehicle, an electric vehicle, or the like can be mentioned. In addition, the power supply device can be appropriately used in applications including a backup power supply device that can be installed in a rack of a computer server, a backup power supply device for a wireless base station for a mobile phone or the like, a power storage power supply for use in a house or a factory, a street light power supply or the like, a power storage device combined with a solar cell, and a backup power supply for traffic lights or the like.

REFERENCE MARKS IN THE DRAWINGS

100: power supply device
1: secondary battery cell
1X: terminal face 1*a*: exterior can
1*b*: sealing plate
1*c*: current collector
2: electrode terminal
3: bus bar
10: battery stack
20: end plate
30: fastening member
31: body
32: fixed part
33: through hole
34: fastener
40, 40B, 40C, 40D, 40E, 40F, 40G: separator
40': end face separator
41: main face
42: guide
43: flat face
44: protruding face
45,45F,45G: first protruding face
46: second protruding face
47: first step
81: building
82: solar cell
83: load
85: DC/AC inverter
91: vehicle body
93: motor
94: generator
95: DC/AC inverter
96: engine
97: wheel
98: charging plug
900: power supply device
901: secondary battery cell
910: battery stack
920: end plate
930: bind bar
940,940': separator
941: recess
HV: vehicle
EV: vehicle

The invention claimed is:

1. A power supply device, comprising:
a plurality of secondary battery cells each including an exterior can having a quadrangular shape and a sealing plate closing an otherwise open end of the exterior can, the plurality of secondary battery cells including a first secondary battery cell and a second secondary battery cell adjacent to the first secondary battery cell, the plurality of secondary battery cells forming a battery stack;
a separator having insulating properties and interposed between the first secondary battery cell and the second secondary battery cell;
one pair of end plates covering both end faces of the battery stack; and
a plurality of fastening members fastening the one pair of end plates together,
wherein,
the separator has a main face including a flat face and a first protruding face, each of the flat face and the first protruding face configured to face the first secondary battery cell,
the first protruding face is nearer to the first secondary battery cell than the flat face in a stacking direction of the battery stack,
the flat face has a first region and a second region both facing an upper peripheral portion of the first secondary battery cell which is adjacent to the otherwise open end closed with the sealing plate of the first secondary battery cell, and
the first protruding face is positioned between the first region and the second region,
wherein an uppermost peripheral edge of the first protruding face is aligned with an uppermost surface of the first secondary battery cell where the sealing plate thereof is located, and
wherein the first protruding face is a linear protrusion not connected with another protruding portion of the separator in a height direction of the first secondary battery cell.

2. The power supply device according to claim 1, wherein the main face of the separator further includes a second protruding face configured to face the first secondary battery cell,
the flat face has a third region and a fourth region,
the second protruding face is positioned between the third region and the fourth region, and
the second protruding face extends in parallel with the first protruding face along a longitudinal direction thereof.

3. The power supply device according to claim 1, wherein the first protruding face has a linear shape and is disposed along the sealing plate of the first secondary battery cell.

4. A vehicle comprising:
the power supply device according to claim 1;
the vehicle comprises the power supply device, a motor for running having power supplied from the power supply device;
a vehicle body constituted by having the power supply device and the motor mounted; and
a wheel that is driven by the motor to run the vehicle body.

5. The power supply device according to claim 1, wherein the flat face and the first protruding face are integrally formed.

6. The power supply device according to claim 1, wherein the flat face and the first protruding face are different members.

7. The power supply device according to claim 6, wherein the first protruding face is provided on the exterior can of the first secondary battery cell.

8. A power supply device, comprising:
a plurality of secondary battery cells each including an exterior can having a quadrangular shape and a sealing plate closing an otherwise open end of the exterior can, the plurality of secondary battery cells including a first secondary battery cell and a second secondary battery cell adjacent to the first secondary battery cell, the plurality of secondary battery cells forming a battery stack;
a separator having insulating properties and interposed between the first secondary battery cell and the second secondary battery cell;
one pair of end plates covering both end faces of the battery stack; and
a plurality of fastening members fastening the one pair of end plates together,
wherein,
the separator has a main face including a flat face, a first protruding face, and a second protruding face, each configured to face the first secondary battery cell, each of the first protruding face and the second protruding face is nearer to the first secondary battery cell than the flat face in a stacking direction of the battery stack, the flat face has a first region and a second region both facing an upper peripheral portion of the first secondary battery cell which is adjacent to the otherwise open end closed with the sealing plate of the first secondary battery cell, the first protruding face is positioned between the first region and the second region, the flat face further has a third region and a fourth region both facing a lower peripheral portion of the first secondary battery cell which is adjacent to a bottom end opposite the otherwise open end closed with the sealing plate of the first secondary battery cell, the second protruding face is positioned between the third region and the fourth region, an uppermost peripheral edge of the first protruding face is offset from an uppermost surface of the first secondary battery cell where the sealing plate thereof is located, a lowermost peripheral edge of the second protruding face is offset from a lowermost surface opposite the uppermost surface of the first secondary battery cell, and the first protruding face and the second protruding face are not connected with each other in a height direction of the first secondary battery cell via another protruding portion of the separator.

* * * * *